(12) United States Patent
Tsuchiya

(10) Patent No.: US 8,607,329 B2
(45) Date of Patent: Dec. 10, 2013

(54) SERVER DEVICE, INFORMATION PROVIDING METHOD AND INFORMATION SUCCESSION SYSTEM

(75) Inventor: Toshiko Tsuchiya, Kanagawa (JP)

(73) Assignee: Icon Corp., Yokohama-Shi (JP)

( * ) Notice: Subject to any disclaimer, the term of this patent is extended or adjusted under 35 U.S.C. 154(b) by 365 days.

(21) Appl. No.: 12/808,924

(22) PCT Filed: Dec. 18, 2008

(86) PCT No.: PCT/JP2008/003851
§ 371 (c)(1),
(2), (4) Date: Jun. 17, 2010

(87) PCT Pub. No.: WO2009/078182
PCT Pub. Date: Jun. 25, 2009

(65) Prior Publication Data
US 2011/0040985 A1    Feb. 17, 2011

(30) Foreign Application Priority Data
Dec. 19, 2007    (JP) ................................ 2007-326779

(51) Int. Cl.
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |

(52) U.S. Cl.
USPC .............. 726/17; 713/193; 705/312; 715/745

(58) Field of Classification Search
None
See application file for complete search history.

(56) References Cited

U.S. PATENT DOCUMENTS

| 4,739,595 A | * | 4/1988 | Yamagata ........................ 52/134 |
| 5,719,918 A | | 2/1998 | Serbetciouglu et al. |
| 5,991,755 A | * | 11/1999 | Noguchi et al. ...................... 1/1 |
| 6,771,163 B2 | | 8/2004 | Linnett et al. |

(Continued)

FOREIGN PATENT DOCUMENTS

| JP | H03-203432 | 9/1991 |
| JP | 07-107082 | 4/1995 |

(Continued)

OTHER PUBLICATIONS

U.S. Appl. No. 13/057,463, filed Feb. 3, 2011, Toshiko Tsuchiya.

(Continued)

*Primary Examiner* — Nadia Khoshnoodi
(74) *Attorney, Agent, or Firm* — Knobbe Martens Olson & Bear LLP

(57) ABSTRACT

An information succession system, which operates in accordance with inputted information to provide access to inputted information, including the personality of the original user, to successors of the original user. An encryption processing unit encrypts inputted information and generates keys used in association with access by users. A character/personality data generation unit generates data indicative of a user's character or personality by analyzing user input information. That character data is stored in a character data memory unit and is associated with the user's identification information. A request information analysis unit analyzes and characterizes requests. Request characteristics are stored in the character data memory unit and associated with the user making the request. A transmitting information generation unit generates transmitting (output) information based on the generated personality data of the user and the characteristic of the request.

18 Claims, 8 Drawing Sheets

(56) References Cited

U.S. PATENT DOCUMENTS

| | | | |
|---|---|---|---|
| 7,221,949 B2 | 5/2007 | Clough | |
| 7,224,956 B1 | 5/2007 | O'Neil | |
| 7,392,057 B2 | 6/2008 | Lee | |
| 7,650,500 B2 | 1/2010 | Matoba | |
| 7,703,023 B2* | 4/2010 | O'Mahony et al. | 715/745 |
| 7,787,911 B2 | 8/2010 | Watanabe | |
| 8,015,245 B2* | 9/2011 | Milic-Frayling et al. | 709/204 |
| 2002/0042846 A1* | 4/2002 | Bottan et al. | 709/249 |
| 2003/0035544 A1 | 2/2003 | Herle et al. | |
| 2004/0159700 A1 | 8/2004 | Khan et al. | |
| 2007/0168480 A1* | 7/2007 | Biggs et al. | 709/223 |
| 2007/0184818 A1 | 8/2007 | Clough | |
| 2007/0201691 A1* | 8/2007 | Kumagaya | 380/30 |
| 2008/0013696 A1 | 1/2008 | Motley et al. | |
| 2008/0242371 A1 | 10/2008 | Chiba et al. | |
| 2009/0024605 A1* | 1/2009 | Yang | 707/5 |
| 2009/0075630 A1 | 3/2009 | McLean | |
| 2010/0266129 A1 | 10/2010 | Tsuchiya | |

FOREIGN PATENT DOCUMENTS

| | | |
|---|---|---|
| JP | H07-303104 | 11/1995 |
| JP | 2001-237872 | 8/2001 |
| JP | 2002-049708 | 2/2002 |
| JP | 2002-56198 | 2/2002 |
| JP | 2002-197287 | 7/2002 |
| JP | 2003-69552 | 3/2003 |
| JP | 2003-150885 | 5/2003 |
| JP | 2003-224683 | 8/2003 |
| JP | 2004-062217 | 2/2004 |
| JP | 2004-248330 | 9/2004 |
| JP | 2004-328144 | 11/2004 |
| JP | 2004-355539 | 12/2004 |
| JP | 2005-235077 | 9/2005 |
| JP | 2006-059283 | 3/2006 |
| JP | 2006-215843 | 8/2006 |
| JP | 2006-254117 | 9/2006 |
| JP | 2006-339732 | 12/2006 |
| JP | 2007-272773 | 10/2007 |
| JP | 2008-015924 | 1/2008 |
| JP | 2009-43196 | 2/2009 |
| WO | WO 2004-068888 | 8/2004 |

OTHER PUBLICATIONS

English translation of the International Preliminary Report on Patentability mailed on Jul. 8, 2010 in PCT Application No. PCT/JP2008/003247.

International Search Report mailed on May 12, 2009 in PCT Application No. PCT/JP2009/000517.

International Search Report mailed on Feb. 24, 2009 in PCT Application No. PCT/JP2008/003247.

English translation of the International Preliminary Report on Patentability mailed on Jul. 29, 2010 in PCT Application No. PCT/JP2008/003851.

Laoufi, Mourad; Heddebaut, Marc; Rouvaen, Jean Mic, "Emergency Calls Location Using TDOA Technique Along a Motorway Dedicated Cellular Radio Network", 2001 IEEE Intelligent Transportation Systems Conference Proceedings, Aug. 25-29, 2001, pp. 930-935.

Shirali-Shahreza, Mohammad, "Emergency SMS", SICE-ICASE International Joint Conference 2006, Oct. 18-21, 2006, pp. 1139-1142.

Non-final Office Action mailed on Jul. 25, 2011 in U.S. Appl. No. 12/742,024.

Non-final Office Action mailed on Dec. 12, 2011 in U.S. Appl. No. 12/742,024.

International Search Report in PCT App. No. PCT/JP2008/003851, mailed Mar. 10, 2009.

* cited by examiner

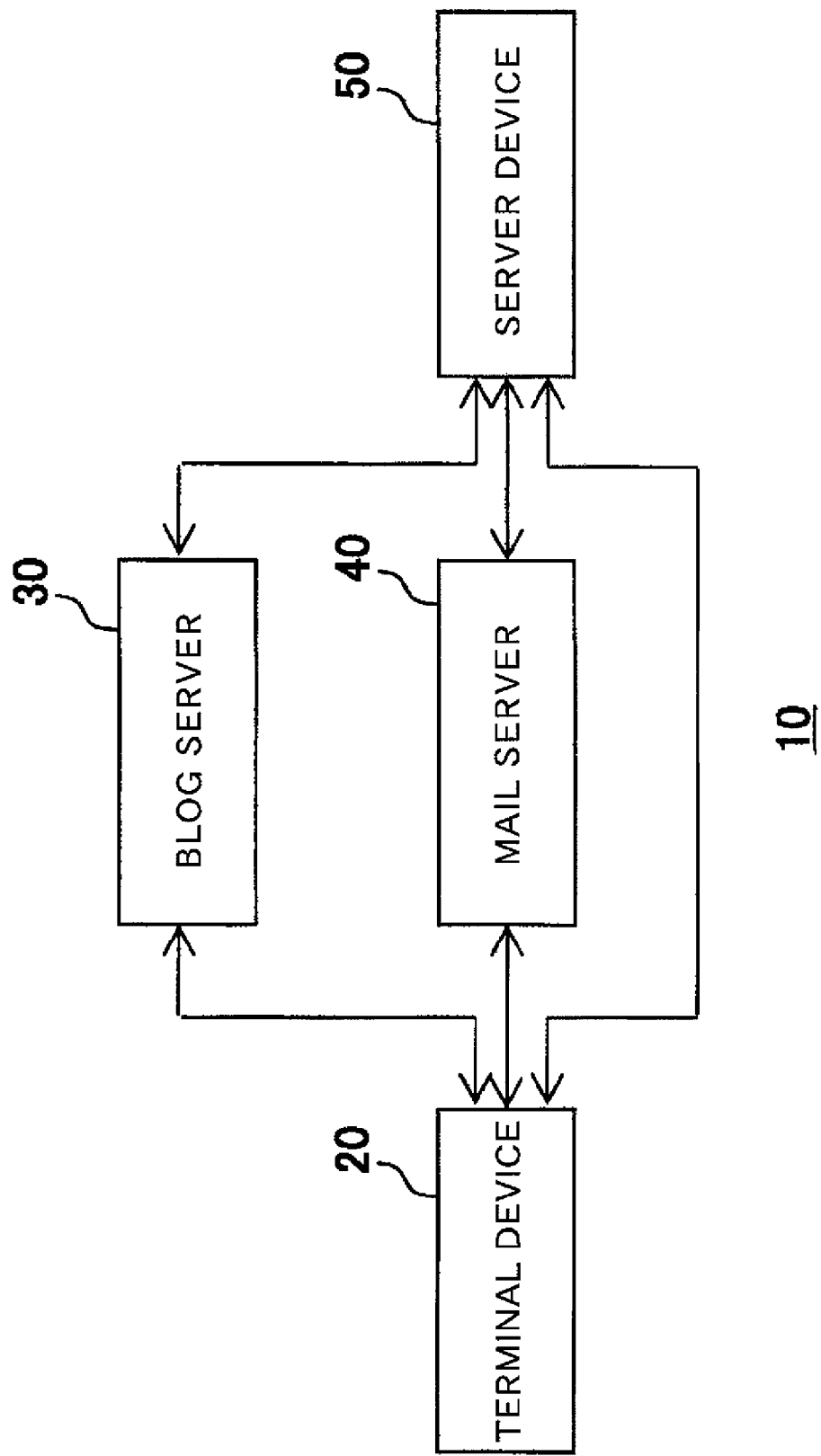

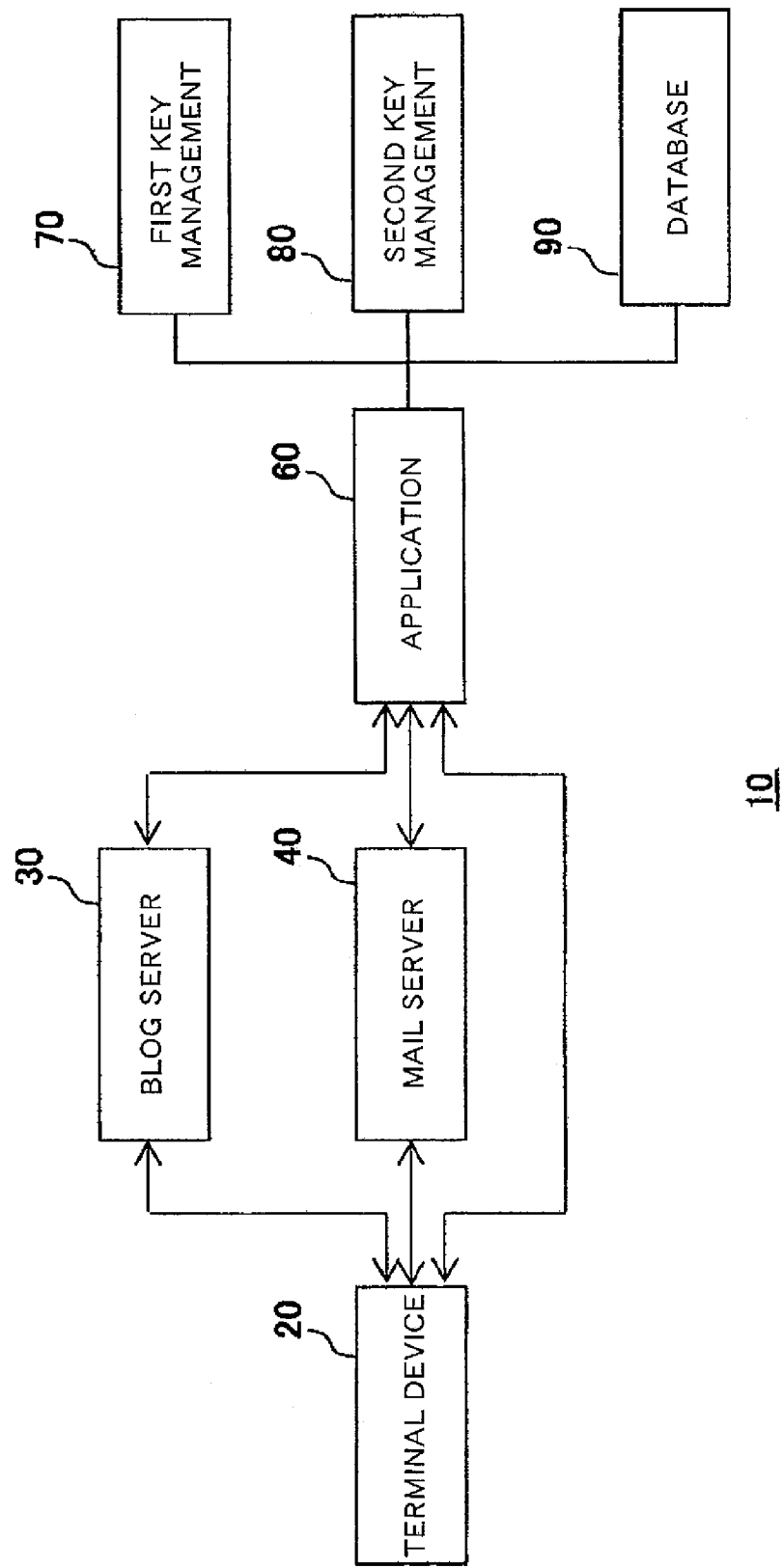

SERVER DEVICE, INFORMATION PROVIDING METHOD AND INFORMATION SUCCESSION SYSTEM

CROSS-REFERENCE TO RELATED APPLICATIONS

This application is a U.S. National Phase of International Application No. PCT/JP2008/003851, filed Dec. 18, 2008, designating the United States and published on Jun. 25, 2009 as WO 2009/078182, which claims priority to Japanese Application No. JP 2007-326779, filed Dec. 19, 2007. The entire contents of these applications are incorporated herein by reference in their entirety.

FIELD OF THE INVENTION

The present invention relates to a computer device connected to a terminal device and used as a server device, into which a user input information and a user identification information are input based on a user's operation of the terminal device, and related to an information providing method and an information succession system using the server device. Specifically, the present invention relates to the server device, the information providing method and the information succession system which can confidentially manage a personal information and all other information on the individual using an encryption definition device and/or encryption key management device, acquire the information required by other user having authority and/or by user himself/herself, and succeed the information (that contains the process or method for acquiring the information required by the successor, and the histories of generating each of combined information containing modified parts, corrected parts or added parts, and amalgamated parts of the information memorized in the process).

DESCRIPTION OF THE RELATED ART

According to the conventional encryption key management device, the encryption key and the decryption key which are necessary for executing the encryption processing, are often managed by the external system operation company. However, in the case where the external administrator manages the encryption key (see Japanese patent application JP 2004-248330A, for example), the person not the internal administrator can get to know the encryption key. Therefore, such management is not desirable for security and may cause the leakage of information.

In recent years, the way of managing the computerized information (including the testament and the property management information, for example) on a system and restrictively supplying the information only to the specified people appointed by the user is in the spotlight (see Japanese patent applications JP2002-197287A, JP2002-49708A, JP2006-59283A, and JP2005-235077A). The degrees of secrecy in these cases are high, and so the management problems discussed above must be solved clearly.

In addition, in recent years, the development of the artificial intelligence comprising the learning function is remarkable, and so the artificial intelligence can generate the information of which the user desires to acquire and supply it (see Japanese patent application JP2007-272773A, for example). However, the conventional artificial intelligence does not manage the generation processes and histories of the acquired information, that is, only supplies the existing information.

SUMMARY OF THE INVENTION

The purpose of the present invention is to provide the server device, the information providing method and the information succession system which use the key management device for preventing the leakage of the personal information by managing the encryption key and decryption key correlated to the user identification information, receive the information input by the user, disclose the personal information and all other information on the individual to the other user having restricted authority and/or to the user only using the key management device and so on, generate the information required by the other user having restricted authority and/or by the user himself/herself, and succeed the information (that contains the process or method for acquiring the information required by the successor (for example, communication information corresponding to the user's personality, habit and so on), and the information generating histories including the combination, modification, correction or addition, and amalgamation given to the information stored in the process).

The further purpose of the present invention is to provide the server device, the information providing method and the information succession system which can specify the objective person required to succeed the information, safely communicate the desired information only to the specified objective person without omission, and succeed the information for generations.

The server device according to a preferred embodiment of the present invention is the server device connected to a terminal device, comprising: a first reception processing unit that receives a user input information and a user identification information, and stores them to a first received information storage area, when the user input information and the user identification information are input to the terminal device by a user's input operation, are transferred from the terminal device to the unsent information storage area, and then to the server device; a personality data generation unit that generates a personality data indicating a user's personality by analyzing the user input information stored in the received information storage area and stores the personality data into the personality data storage area; a personality data storage unit that stores the personality data stored in the personality data storage area with correlating the user identification information; a second reception processing unit that receives a request information for requesting an acquirement of an information correlated to the user and the user identification information stored in the received information storage area, and stores them into a second received information storage area, when the request information and the user identification information are sent from the terminal device to the server device; a request information analyzing unit that generates a characteristic data indicating a characteristic of the request information by analyzing the request information, and stores the generated characteristic data into a characteristic data storage area; a personality data searching unit that searches the personality data correlated to the user identification information from among the personality data stored in the personality data storage unit; a communication information generation unit that generates a communication information correlated to the user using the characteristic data stored in the characteristic data storage area and the searched personality data, and stores it into a communication information storage area; and a sending processing unit that makes the server device to send the communication information stored in the communication information storage area to the terminal device, and makes the terminal device to output the communication information.

Incidentally, a personal computer (PC) or a mobile terminal device can be used as the terminal device connected to the server device, however, the terminal device is not limited to these devices.

The user is not limited with regard to the age, the sex or the circumstance. The user means an individual who desires to succeed at least one user input information from among all information including information on the user, the information on human relations, the information about succession and all other information, or a user identification information and the encryption key, to the successor, friend or next generations. In addition, a user can also mean an individual who succeeds the user input information or the user identification information.

Moreover, the user means predetermined legal company, including a section of the company, an employee, a manager and other people belonging to the company. In other words, the user means the section of the company, the specified employee and a company desiring to succeed at least from among the information related to the user's businesses, as well as an organization or an employee to which the user information or the user identification information is succeeded.

The user input information means at least one of the all information (that includes an owned diary, a calendar or other information recording family events, for example), images (that includes photographs or other still pictures, and includes video, DVD or other motion pictures, for example), music (which includes predetermined music information of the MP3 or other format, for example), natural voice recorded by the predetermined method, a school report of user's child, a certificate of merit of user's child, an e-mail sent or received by the user and other personal information about the user, information on the successor and the human relations, information about the succession (that includes the asset register, the statement of assets, the official document, the copy of the certificate of insurance, the number of an insurance policy, the number of the bank account, the stock and the testament) and all other information desired to be input by the user.

The user identification information means an information including at least one of information for identifying the user, for example, the transmitter's name (containing the phonetic symbols), the birth date, the user identification number (UTN) (fifteen digits) of the mobile phone terminal, FOMA (trademark) card identity number (UIM) of the mobile phone terminal, ID of the mobile phone terminal, the photograph or other still picture and the motion image.

The personality data generation unit of the server device according to the present invention can be constructed so as to generate the vocabulary distribution data, which indicates the appearance frequency of each word, by classifying the character information in the user input information by words, and generate the personality data by comparing the generated vocabulary distribution data and the standard vocabulary distribution data previously generated as the standard used when the personality data is generated.

The personal data generation unit of the server device according to the present invention can be constructed so as to generate the personality data by choosing plural elements as the elements of characterizing the personality, and rating the chosen element on the scales of the predetermined number.

Otherwise, the personal data generation unit of the server device according to the present invention can be constructed so as to generate new personality data one by one, by analyzing the user input information with referencing the personal data stored in the personality data storage unit when the user input information is provided from the terminal device, and to store them into the personality data storing unit accumulatively.

The request information analyzing unit according to the present invention can be constructed so as to generate the characteristic data by extracting at least one word characterizing the whole of the request information from among the words included in the character information of the request information, and to interchange the generated information with the terminal device.

The server device according to the present invention can be constructed to further comprise: an encryption definition file management unit that manages plural keys used for the encryption by the encryption processing unit when the user input information and the user identification information, which are input based on the user's input operation of the terminal device, are provided to the user registration unit; an encryption processing unit that encrypts the user input information and the user identification information using the key in the encryption definition file acquired from the encryption definition file management unit; a data storage unit that stores the first user input information, which is encrypted by the encryption processing unit, with correlating to the user identification information; a data searching unit that searches the first user input information correlated to the user identification information from among the first user input information stored in the data storage unit using the second user input information as a search key word, then, searches the user input information in connection with the characteristic data from among the searched first user input information using the second user input information; and a decryption processing unit that decrypts the searched user input information using the key in the encryption definition file acquired from the encryption definition file management unit; wherein a communication information generation unit generates the communication information using the characteristic data, the personality data and the searched user input information.

The server device contains a system comprising a first key management device and a second key management device (hereinafter, these devices are called 'an encryption definition management server' as a whole), a database device storing an information on the user (hereinafter, called 'a database server'), a server device having each processing unit containing an encryption unit, a decryption unit and a data processing unit (hereinafter, called 'an application server'). Hereinafter, the encryption key system according to the present invention is called encryption system.

The encryption definition key management server is the server computer which manages the encryption definition file, and comprises the program for managing the encryption definition file which is an aggregate of the encryption keys, but the encryption definition key management server does not manage the encryption key. Regarding the working program of the server, the encryption definition key management server does not acquire the network key, but downloads the encryption definition file which is the aggregate of the encryption keys, and temporary stores the aggregate of the encryption keys into the storage unit of the server device (a memory, for example). After being downloaded to the terminal device, the encryption definition file is decrypted on the memory of it and saved in the memory. The encryption definition file is saved until when the application finishes the execution commanded by the terminal device or until when the predetermined time passes from the execution of the system. In addition, the encryption definition file can be deleted from the memory of the server device by the arbitrary operation. The predetermined information including the user input information which should be recorded is encrypted by the encryption method of the present invention and stored into the encryption information area of the server device, for example, the storage unit. The encryption information area must not be located in the server device itself, but can be shared with other servers via a network. Incidentally, according to the encryption system of the present invention, the encryption and decryption of the electric information which should be memorized are executed only when the application is executed, and the decrypted electrical information is deleted from the memory of the server device when the application is ended. Furthermore, at the terminal device side, the information processed by the server device is received by the terminal device and displayed on the terminal device display unit, and the information is deleted from the terminal device when the application of the server device is ended based on, for example, the arbitrary operation.

When the predetermined encrypted information stored in the encryption information area is searched, the search information is used for the search process after encrypted using the encryption definition file, and so all kinds of search processing of the application executed by the encryption system can be employed.

Therefore, the above described encryption system does not comprise different keys by each file of the electronic information, but can set different encryption keys and different encryption method by each field item in one data among the whole data of the electronic information managed in the encryption system.

Moreover, the encryption system is a system which does not only decrypt all acquired information, but can use the data without decrypting based on the application user authority provided to the application user by each field item in one acquired data, and so the encryption system can supply the method of the encryption and the decryption in which the application utilizing the encryption system executes encryption and decryption by each field item in one data.

The method for concealing the key is described hereinafter.

Firstly, the storage area of the encryption definition file (hereinafter, called 'directory'), which is not concealed, is set. At the time of installing, a large number of pseudo encryption definition files (hereinafter, called 'dummy file') are generated (for example, one thousand files). At this time, the real encryption definition file is divided into four parts and written into the directory. The file name of each dummy file and real file is encrypted and so the relationships between them cannot be understood at a glance. Also, the dummy files are divided into four parts. These files are called 'key file' as a whole.

A large number of combinations (for example, a hundred billion combinations) needs to be tried out for discovering the four real encryption definition files from among the key file. On the other hand, the encryption definition files can be discovered immediately after the writing out of real encryption definition files using timestamp, so timestamps of all files are renewed (or overwritten) immediately after the writing, as tricks. However, even if the timestamps are renewed, the increase of the key file can be understood by comparing with the last key file, when the real encryption definition file is written newly. Therefore, a large number of dummy files (for example, a hundred files) are written together with the new writing, and the old dummy files are deleted. As a result, the combinations for forming the encryption definition file can be still many (for example, about a hundred million combinations), even if the difference is detected.

Next, the generation of the file names of the encryption definition files is described concretely hereinafter.

The encryption definition file name is always encrypted by using a predetermined standard character string. The reason for using the predetermined standard character string is that the files can be extracted from the key file. The random key is unsuitable because all file names of the key file needs to be decrypted for finding the required file. In addition, it is worried that the length of the original character strings might reflect the length of the encrypted character strings, so the file name is encrypted after adjusting the file name length to the predetermined length, and a character string is added to the basic file name (i.e. the file name provided with the real encryption definition key) so as to become the file name of the purposed length. Consequently, the same file name is generated whenever the basic file name is the same, so the required file can be always extracted from the key file.

The information providing method according to an embodiment of the present invention related to the providing method of server device connected to the terminal device, comprising: a first receiving processing step that receives a user input information and a user identification information, and stores them into a first received information storage area, when the user input information and the user identification information are input to the terminal device by a user's input operation, transferred from the terminal device to the unsent information storage area, and sent from the area to the server device; a personality data generation step that generates a personality data indicating a user's personality by analyzing the user input information stored in the received information storage area, and stores the personality data into the personality data storage area; a personality data storage step that stores the personality data stored in the personality data storage area with correlating to the user identification information; a second reception processing step that receives a request information for requesting an acquirement of an information correlated to the user and the user identification information stored in the received information storage area, and stores them into a second received information storage area, when the request information and the user identification information are sent from the terminal device to the server device; a request information analyzing step that generates a characteristic data indicating a characteristic of the request information by analyzing the request information, and stores the generated characteristic data into a characteristic data storage area; a personality data searching step that searches the personality data correlated to the user identification information from among the personality data stored in the personality data storage unit; a communication information generation step that generates a communication information correlated to the user using the characteristic data stored in the characteristic data storage area and the searched personality data, and stores it into a communication information storage area; and a sending processing step that makes the server device to send the communication information stored in the communication information storage area to the terminal device, and makes the terminal device to output the communication information.

The personality data generation step of the information providing method of the server device according to the present invention can be constructed so as to generate the vocabulary distribution data, which indicates the appearance frequency of each word, by classifying the words of a character information in the user input information, and to generate the personality data by comparing the generated vocabulary distribution data and a standard vocabulary distribution data previously generated as a standard used when the personality data is generated.

The personality data generation step of the information providing method of the server device according to the present invention can be constructed so as to generate the personality data by choosing plural elements as elements for specifying the personality, and rating the chosen element on the scales of a predetermined number.

Otherwise, the personality data generation step of the information providing method of the server device according to the present invention can be constructed so as to generate new personality data by analyzing the user input information with referencing the personal data stored in the personality data storage unit when the user input information is provided from the terminal device, and to store them into the personality data storing unit accumulatively.

The request information analyzing step of the information providing method of the server device according to the present invention can be constructed so as to generate the characteristic data by extracting at least one word characterizing the whole of the request information from among the words included in the character information of the request information, and to interchange the generated information with the terminal device.

The information providing method of the server device according to the present invention can be constructed to further comprise: an encryption processing step that encrypts the user input information using a key acquired from an encryption definition file; a data storage step that stores the first user input information, which is encrypted by the encryption processing unit, with correlating to the user identification information; a data searching step that searches the first user input information correlated to the user identification information from among the first user input information stored in the data storage unit using the second user input information as a search key word, then, searches the user input information in connection with the characteristic data from among the searched first user input information using the second user input information; and a decryption processing step that decrypts the searched user input information using the key acquired from the encryption definition file; wherein the communication information generation step generates the communication information using the characteristic data, the personality data and the searched user input information.

The information succession system according to the present invention is the information succession system which manages the information which is encrypted and succeeds the encrypted information, comprising: an application server that executes sending and receiving information via a network, an encryption definition management server that manages the encryption definition file which is an aggregation of encryption keys used for encrypting the information, a data base server that stores the information encrypted using the encryption key; wherein the encryption definition management server encrypts all of dummy files and real encryption definition file and extracts the required file specified by plural encryption definition files using a standard character string.

The server device and the information providing method according to the present invention can generate the communication information corresponding to the user's personality, and can provide it to the specified user.

In the case where the user is an individual, for example, the user records the matters, of which the user wants to communicate to one's wife, husband, son, daughter, father and mother, in each case. For example, one's thinking on a routine basis, commemorative photographs, commemorative movies, favorite music, voices and mails are recorded as individual sense of value and as means for communicating the predetermined user input information to other people, like a diary (or a blog). In this way, at the time of the user's illness, the user's job changing, the marriage of the user's child and so on, the user can communicate one's thinking of which the user wants to communicate or leave to one's loved one such as the wife, the husband, the son, the daughter, the father and the mother. Moreover, in the case where the 'will' is recorded with the history for preparing the user's 'death' that is the biggest event in one's life, the information required for viewing the predetermined information left by an individual when he/she 'dies' is succeeded, and the access authority are succeeded by providing the encryption key. As a result, the bereaved family members and the loved ones are provided with the authority for getting the messages as emotional support, and are encouraged by the recorded massages. Moreover, in the case where the editing function of the artificial intelligence is additionally provided, the messages can be developed, and so 'the conversation with the decedent' (accurately, the imitation of the conversation with the decedent) as if the user is actually responding can be realized by the central processing device of the computer which extracts the necessary keyword from the above described recorded information, analyzes the information recorded with correlated to a question (i.e. input information) and assembles sentences or answers when the user's wife, husband, son, daughter, father, mother and so on asks the user (who is already dead) as if they are having a conversation.

Therefore, the person (for example, the successor), who is authorized to access the stored user input information, can access the user input information in response to the questions at any time, for example, when the authorized person feels lonely, when the authorized person wants advice, when the authorized person wants to share his/her joy. The corresponding message and the generated message are sent as if the user is alive (same as memories of life together) by an e-mail or a telephone (using recorded voice). Moreover, it is possible to register so as to send massages at set time interval as a schedule of future. For example, the message can be sent at the 20th birthday of the child or the wedding anniversary of the couple according to the growth of the child.

Incidentally, the successor or other person who succeeds the information can abandon the access authority, and the access authority can be succeeded to the legal successor when there is no right holder.

BRIEF DESCRIPTION OF THE DRAWINGS

FIG. 1A is a block diagram showing the structure of an information providing system according to an embodiment of the present invention.

FIG. 1B is a block diagram showing the structure of another information providing system according to an embodiment of the present invention.

DESCRIPTION OF THE PREFERRED EMBODIMENTS

An embodiment of the present invention is described hereinafter.

Figure 2:
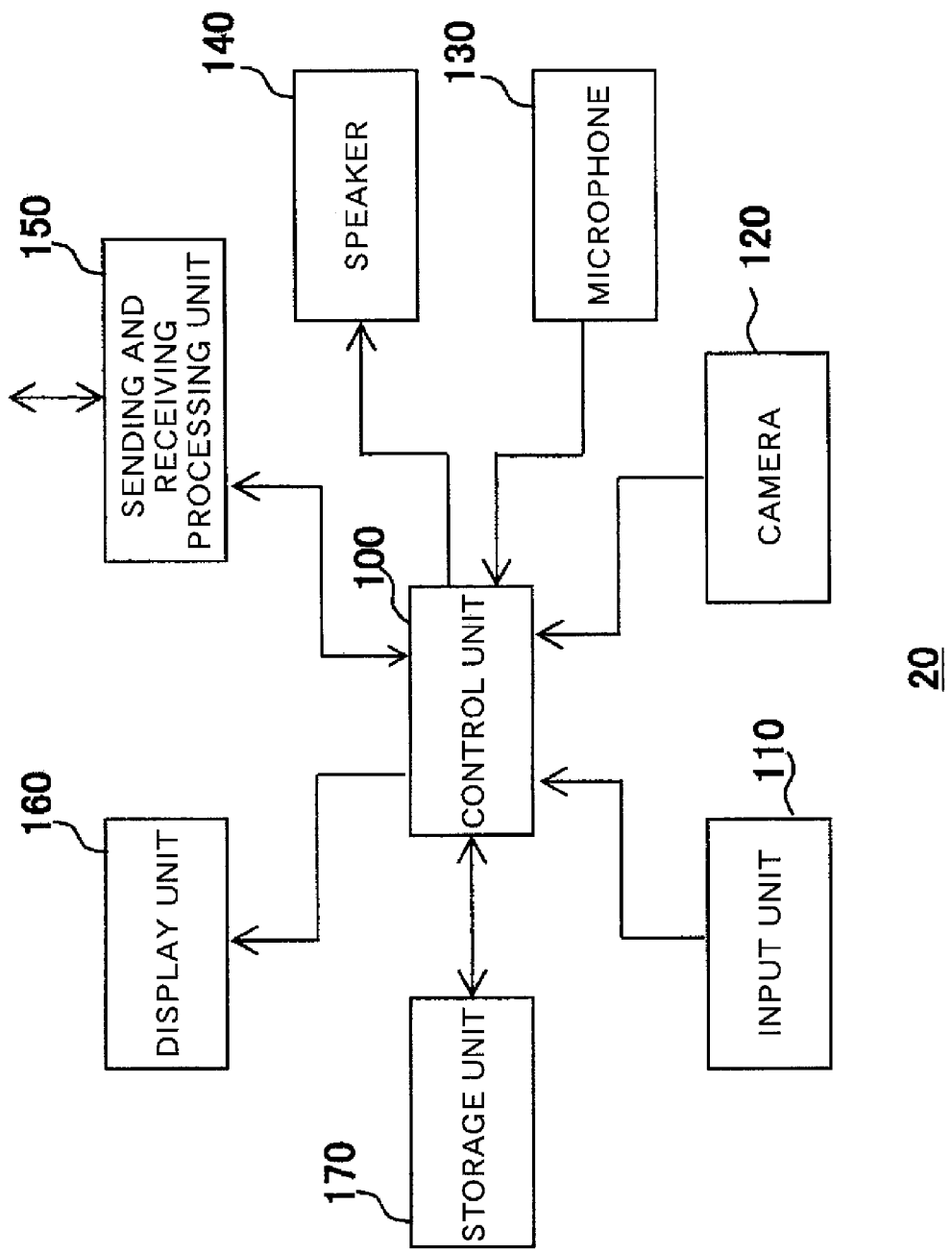
FIG. 2 is a block diagram showing the structure of the terminal device according to the information providing system.
Figure 3:
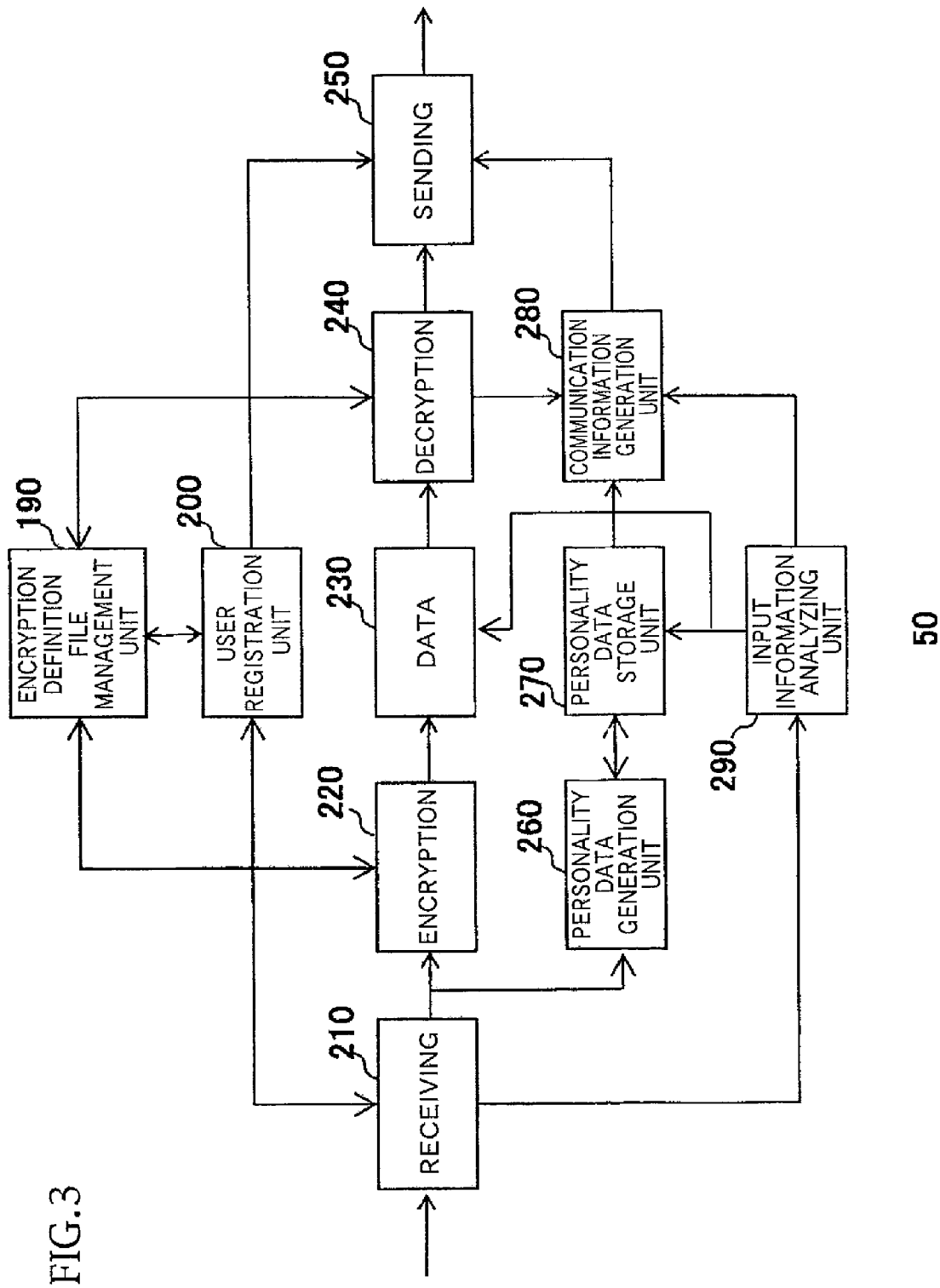
FIG. 3 is a block diagram showing the structure of the server device according to the information providing system.

FIG. 1A shows the structure of the information providing system 10 according to the embodiment of the present invention. The information providing system 10 is the system for realizing the information providing service to provide the information correlated to the user (hereinafter, called 'the contractor of the service') to the heir (hereinafter, called 'the successor') after the user's death, and comprises the terminal device 20, blog server 30, mail server 40 and the server device 50. Incidentally, the circuit structure of the terminal device 20 is shown in FIG. 2, and the circuit structure of the server device 50 is shown in FIG. 3.

FIG. 1B is a block diagram showing the structure of another information providing system according to the embodiment of the present invention. As shown in FIG. 1B, each unit and each function of the server device 50 shown in FIG. 1A can be distributed and individually constructed as the application server 60, the first key management device 70, the second key management device 80 and the database server 90. By using such a distributed system, the security can be enhanced, and so it is more preferable than the centralized processing by the server device 50 shown in FIG. 1A. Incidentally, in the above and following description, each of the server device, the computer device, the management device and the information processing device comprises a storage area (e.g. memory) or a storage device (e.g. internal hard disk) in it, performs the information processing using the hardware resource of the computer device by giving the information processing such as a calculation to the data written to or read from the storage area or the storage device. These storage areas or the storage devices are generally built in each of the server device, the computer device, the management device and the information processing device, and so there are cases where they are omitted in Figures. However, the storage areas or the storage devices are built in these devices even if they are not shown.

In the case of FIG. 1B, the first key management device 70 manages the first encryption definition file which is an aggregation of plural first keys, the second key management device 80 manages the second encryption definition file which is an aggregation of plural second keys. Incidentally, the first key indicates the key which can identify a person requiring the utilization (hereinafter, called 'a service contractor' or 'a successor') as the valid user, and can use for obtaining the second key necessary for acquiring the data. The second key indicates the key used when the registered information is encrypted and/or decrypted and can be used for restricting the extent of the data to which the successor is permitted to view.

At first, the user (for example, the father or other service contractor according to the present invention) sets and inputs the name or other ID information (i.e. the user identification information) and the password (i.e. the certification information) by operating the input unit 110 of the terminal device 20. When the ID information and the password are set and input, the control unit 100 stores them into the storage unit 170 as necessary and send them to the server device 50 via the sending and receiving processing unit 150.

The receiving processing unit 210 of the server device 50 receives the ID information and the password, then, outputs them to the user registration unit 200. The user registration unit 200 registers and stores these ID information and password, and, issues the successor's ID information and successor's password which are necessary when the successor (for example, the mother, the son, the daughter, the third person or other successor), who is previously registered while the user is alive, acquires the information correlated to the user before and/or after the user's death. Then, the user registration unit 200 outputs them to the sending processing unit 250. Otherwise, it is possible that the successor checks the renewal of the blog data of the blog server 30 periodically, contacts the service contractor (for example, using an e-mail or a telephone) if the blog is not renewed, then, issues the successor's ID information and successor's password and outputs it to the sending processing unit 250 when there is no response.

That is, the unique first key is provided to the successor registered by the encryption processing unit 220 based on the information input from the receiving processing unit 210 via the user registration unit 200. When the successor except for the service contractor accesses the predetermined registered information in the data storage unit 230 having the function of the database, the second key needs to be acquired using the first key automatically generated when the service is certificated. The second key provided to the successor has the function of restricting the extent of the data to which the successor is permitted to view.

The sending processing unit 250 sends the successor's ID information and the successor's password to the terminal device 20. The sending and receiving processing unit 150 of the terminal device 20 receives the successor's ID information and the successor's password, then, the sending and receiving processing unit 150 outputs and stores them into the storage unit 170 under the control of the control unit 100.

After the registration of the user, the terminal device 20 accesses to the blog server 30 based on the user's input operation using the input unit 110, and sends the various kinds of input information to the blog server 30.

That is, when the character information input from the input unit 110, the picture information input from the camera 120, the voice information input from the microphone 130 and so on are provided, the control unit 100 of the terminal device 20 sends these user input information to the blog server 30 via the sending and receiving processing unit 150 together with the ID information and the password stored in the storage unit 170.

The blog server 30 stores the user input information sent from the terminal device 20, and sends the sent user input information to the server device 50 together with the ID information and the password.

Otherwise, after the registration of the user, the terminal device 20 can be set so as to access to the mail server 40 based on the user's input operation using the input unit 110, and to send the mail to the server device 50 in the case where the mail addressed to the successor has been received by the mail server 40.

As a result, when the character information input from the input unit 110, the picture information input from the camera 120 and so on are provided, the control unit 100 of the terminal device 20 sends these user input information to the mail server 40 via the sending and receiving processing unit 150 together with the ID information and the password stored in the storage unit 170.

The mail server 40 sends the mails sent to or received from the successor, which are selected from among the mails sent from the terminal device 20, to the server device 50 as the user input information together with the ID information and the password.

Additionally, after the registration of the user, the will, the number of an insurance policy, the number of the bank account, the stock or other information corresponding to the succession are input to the control unit 100 of the terminal device 20 based on the user's input operation using the input unit 110, then, the control unit 100 directly sends these information to the server device 50 via the sending and receiving processing unit 150 as the user input information together with the ID information and the password stored in the storage unit 170.

By working as the first receiving processing unit, the receiving processing unit 210 of the server device 50 outputs the ID information and the password to the user registration unit 200 when receiving the user input information, the ID information and the password. The user registration unit 200 commands the encryption definition file management unit 190 to acquire the first key used for executing the certification processing using the sent ID information and the sent password, finds the corresponding first key from among the first encryption definition file transferred from the encryption definition file management unit 190, executes the certification processing using the sent ID information and the sent password, and as a result, outputs the certification success information to the receiving processing unit 210 if the certification is succeeded.

When the certification success information is provided from the user registration unit 200, the receiving processing unit 210 outputs the user input information and the ID information to the encryption processing unit 220 and the personality data generation unit 260. The encryption processing unit 220 commands the encryption definition file management unit 190 to acquire the second key used for encrypting the user input information, encrypts the user input information using the second key transferred from the encryption definition file management unit 190, and stores the encrypted user input information to the data storage unit 230 with correlating to the ID information. As a result, the server device 50 encrypts and stores the user input information one by one whenever the user input information is provided from the terminal device 20.

The service contractor can register the information by dividing the information into plural groups. When registering the information divided into plural groups, the second keys, each of which is used for encrypting and/or decrypting the data of the corresponding group, are generated by each group, then, the information is encrypted and registered. When registering the successors, the service contractor can register which group information to be succeeded to which successor, and so can correlates the second key, which is generated by each group, to the successor. The second key correlated to the registered successor can be correlated to the first key which is generated based on the information of the user and the successor.

Figure 5:
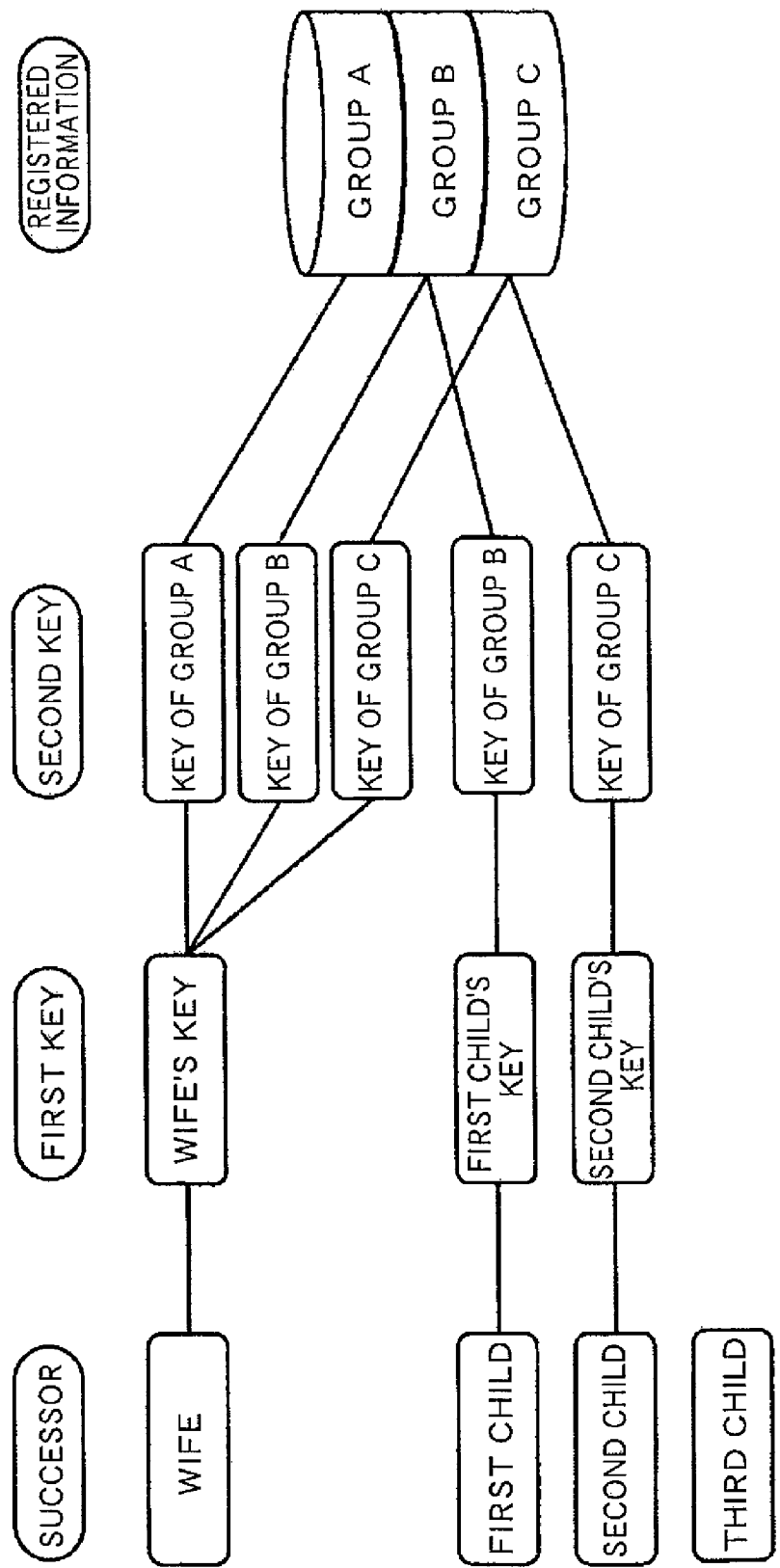
FIG. 5 is a conceptual diagram according to an example of the present invention, showing the relationship between the first to second keys and the registered information of which a successor can view.

FIG. 5 is a conceptual diagram according to an embodiment of the present invention, showing the relationship between the first to second keys and the registered information to which the successor is permitted to view. As shown in FIG. 5, the 'wife' as a successor has a first key as the 'wife's key', and at the same time has the 'key of group A', the 'key of group B' and 'key of group C' as the second keys correlated to the wife's key, so the wife can view the registered information of the groups A, B and C. Similarly, the 'first child' can view only the information of group B and the 'second child' can view only the information of group C. In contrast, the 'third child' cannot view any registered information because the third child is not registered as a successor and does not have the first and second keys. Incidentally, when registered as a successor and so permitted to view the information, the person can specify the new successor and can register the user input information as a new service contractor.

When the user input information and the ID information are provided, the personality data generation unit 260 generates the personality data indicating the personality of the user by analyzing the user input information and stores the generated personality data to the personality data storage unit 270 with correlating to the ID information.

Hereinafter, an example of the method for generating the personality data is described. For example, the personality data generation unit 260 classifies the character information in the user input information to the words such as the noun, the verb, the adjective, the adverb, the interjection, auxiliary verb etc., and generates the vocabulary distribution data, which indicates the appearance frequency of each word.

Incidentally, the personality data generation unit 260 previously has the standard vocabulary distribution data which corresponds to various kinds of personality pattern and used as the standard for generating the personality data. The personality data generation unit 260 compares the vocabulary distribution data generated using the user input information with the standard vocabulary distribution data generated in advance, and analyzes it.

Consequently, the personality data generation unit 260 generates the basic data for forming the personality data indicating the personality of the user, by choosing plural elements for specifying the personality, for example, 'gentle', 'severe', 'cool', 'emotional', 'inpatient' and 'cheerful' etc., and rating the chosen elements on a zero to ten scale (the number of the scale is not restricted and can be decided freely).

Since then, the personality data generation unit 260 stores new personality data one by one to the personality data storage unit 270, by analyzing the user input information with referencing the personality data stored in the personality data storage unit 270, when the user input information is provided from the terminal device 20.

After that, when the successor, for example, feels like he/she wants to talk with the user in life, the successor inputs the desired message to the terminal device 20 by operating the input unit 110. The control unit 100 sends the input message to the server device 50 via the sending and receiving processing unit 150 as the successor input information (i.e. the request information for requesting the acquirement of the information correlated to the user) together with the successor's ID information and the successor's password stored in the storage unit 170.

By working as the second receiving processing unit, the receiving processing unit 210 of the server device 50 outputs the ID information and the password to the user registration unit 200 when receiving the successor input information, the successor's ID information and the successor's password. The user registration unit 200 executes the certification processing using the ID information and the password sent from the receiving processing unit 210, and as a result, outputs the certification success information to the receiving processing unit 210 if the certification is succeeded.

The receiving processing unit 210 outputs the successor input information and the ID information to the input information analyzing unit 290 when the certification success information is provided from the user registration unit 200.

The input information analyzing unit 290, which works as the request information analyzing unit, generates the characteristic data, which indicates the characteristic of the successor input information, by analyzing the successor input information.

Hereinafter, an example of the method for generating the characteristic data is described. For example, the input information analyzing unit 290 generates the characteristic data by extracting at least one or more words which characterize the whole successor input information from among the words contained in the character information represented by the successor input information.

Then, the input information analyzing unit 290 outputs the ID information to the personality data storage unit 270, outputs the ID information and the characteristic data to the data storage unit 230 and outputs the characteristic data to the communication information generation unit 280.

By working as the personality data search unit, the personality data storage unit 270 searches the personality data correlated to the ID information from among the personality data stored in the personality data storage unit 270 itself, and outputs the searched personality data to the communication information generation unit 280.

By working as the data search unit, the data storage unit 230 searches the user input information correlated to the ID information from among the user input information stored in the data storage unit 230 itself, then, searches the user input information related to the characteristic data (e.g. sent mail, received mail or other sentences) from among the searched user input information, and outputs the obtained user input information to the decryption processing unit 240.

The decryption processing unit 240 give command to acquire the second key, which is used for the decryption of the provided user input information, to the encryption definition file management unit 190, decrypts the provided user input information using the second key transferred from the encryption definition file management unit 190, and outputs the decrypted user input information to the communication information generation unit 280.

The communication information generation unit 280 generates the communication information for communicating to the successor (i.e. the information correlated to the user) using the characteristic data indicating the characteristic of the successor input information, personality data of the user (i.e. ancestor) and the user input information corresponding to the successor input information, and send it to the terminal device 20 via the sending processing unit 250.

The sending and receiving processing unit 150 of the terminal device 20 receives the communication information sent from the server device 50, and then, outputs it to the control unit 100. The control unit 100 informs the messages to the successor by displaying the character information according to this communication information on the display unit 160. Incidentally, in this case, the control unit 100 may output the voice corresponding to the communication information from the speaker 140 with displaying the face image of the ancestor, namely the user, or other moving image on the display unit 160.

Otherwise, it can be employed that the information is acquired by searching the information corresponding to the repetition, when the question information from the successor to the user are obtained in a repetitive manner.

When the application server 60, which comprises the each function corresponding to the server device 50, executes the service processing according to the present application and the terminal device 20 terminates the service processing, all information only used for displaying at the side of the terminal device 20 are deleted. Moreover, the predetermined information communicated between the server device 50 and the terminal device 20 or between the application server 60 and the terminal device 20 are protected by the encrypted communication using the SSL (Secure Socket Layer) or other predetermined encrypted communication protocol. While the service is processed, the server device 50 or the application server 60 executes the processing including the encryption and/or the decryption of the predetermined registration information, the sending and receiving of the electronic information, the acquisition of the first key and the acquisition of the second key.

Incidentally, the server device 50 may send the user input information decrypted by the decryption processing unit 240 to the terminal device 20 via the sending processing unit 250 without generating the communication information by the communication information generation unit 280.

The server device 50 may make the data storage unit 230 to search the user input information corresponding to the age of the successor from among the user input information stored in the data storage unit 230 at the timing when the successor reaches the predetermined age, next, make the decryption processing unit 240 to decrypt the searched user input information, then, make the decrypted information to be sent to the terminal device 20.

Figure 4:
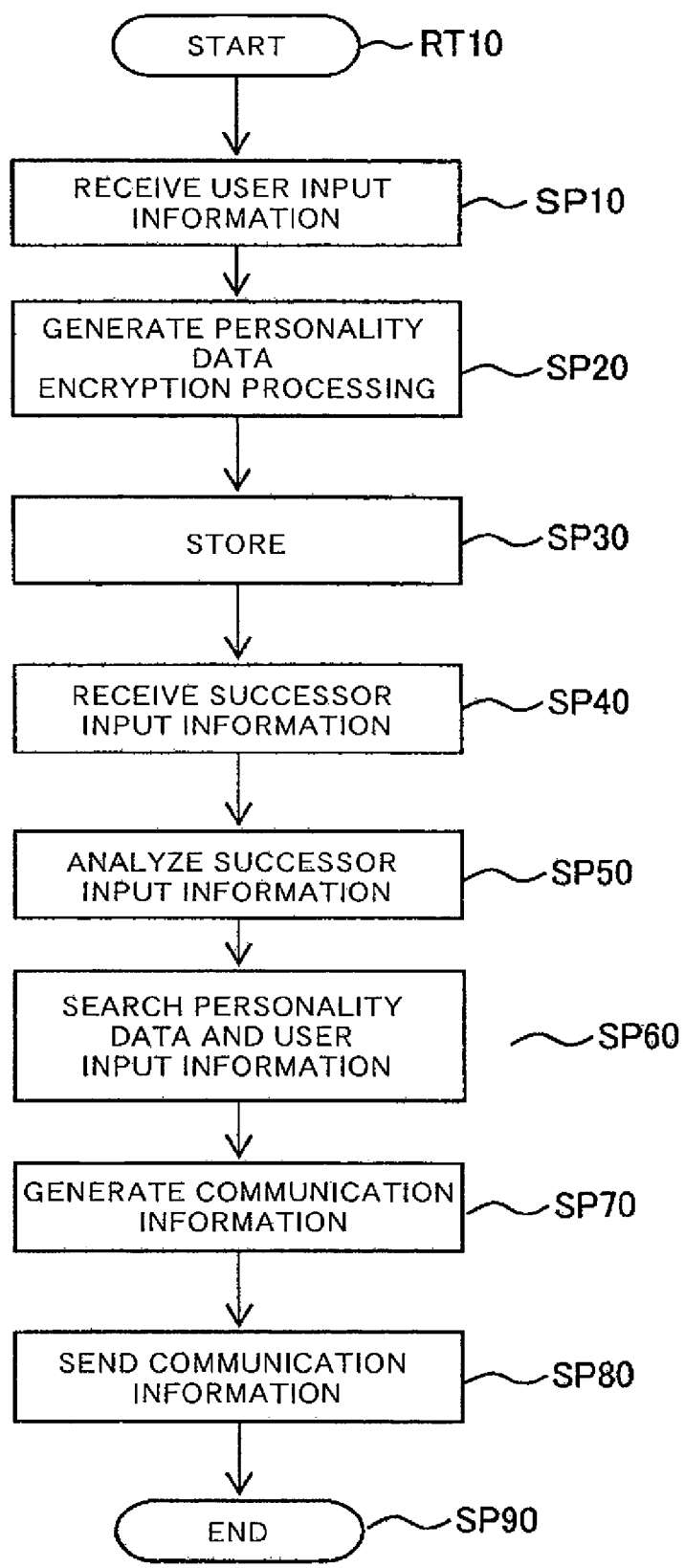
FIG. 4 is a flowchart showing the procedure of the information providing processing according to the embodiment of the present invention.

FIG. 4 shows the information providing processing procedure RT10 according to the present embodiment. As shown in FIG. 4, the server device 50 inputs the user input information based on the user's input operation of the terminal device 20. When the information providing processing procedure RT10 starts, the process jumps to SP10 and the receiving processing unit 210 receives the user input information and the ID information sent from terminal device 20.

At the step SP20, the personality data generation unit 260 analyzes the received user input information and generates the personality data indicating the personality of the user. Meanwhile, the encryption processing unit 220 commands the encryption definition file management unit 190 to acquire the second key used for encrypting the received user input information, and encrypts the received user input information using the second key transferred from the encryption definition file management unit 190.

In other words, the encryption processing unit 220 encrypts the user input information and generates the first and second keys provided for the successor registered by the service contractor. The first key is automatically generated by the calculation processing of the server device using the combination of the user identification information of the service contractor oneself and the information corresponding to the successor. For example, the first key can be automatically generated by a series of processing shown in FIG. 6 using the combination of the ID information, for example, the name, the birth date, the wedding anniversary and the wife's name of the identical person (hereinafter, called 'certification information').

Figure 6:
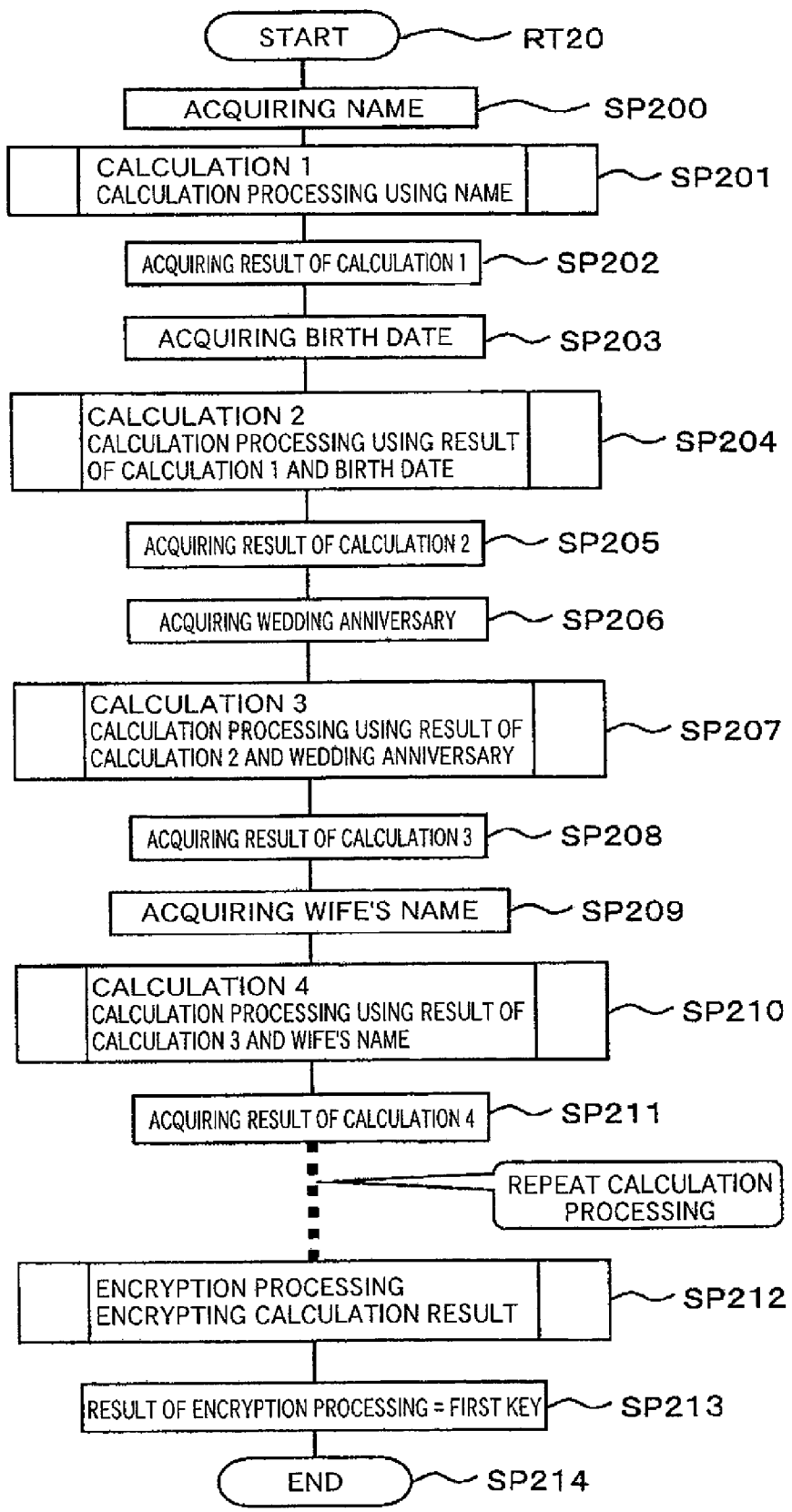
FIG. 6 is a flow chart according to an example of the present invention, showing an automatic generation of the first key when registering the predetermined information and a certification processing of the first key by a successor.

FIG. 6 is a flow chart according to an embodiment of the present invention, showing an automatic generation of the first key when registering the predetermined information and a certification processing of the first key by the successor. As shown in FIG. 6, when the information encryption processing procedure RT20 starts, the server device 50 or the application server 60 acquires the name input from the input unit of the terminal device 20 at the step SP200, the encryption processing unit 220 executes the calculation processing, which can contain the predetermined random calculation, using the name received via the receiving processing unit 210 (hereinafter, called 'calculation 1') at the step SP201, consequently, the result of the calculation 1 is acquired at the step SP202. Next, the server device 50 or the application server 60 acquires the birth date input from the input unit of the terminal device 20 at the step SP203, the encryption processing unit 220 executes the calculation processing, which can contain the predetermined random calculation, using the result of the calculation 1 and the birth date received via the receiving processing unit 210 (hereinafter, called 'calculation 2') at the step SP204, consequently, the result of the calculation 2 is acquired at the step SP205. Then, the server device 50 or the application server 60 acquires the wedding anniversary input from the input unit of the terminal device 20 at the step the SP206, the encryption processing unit 220 executes the calculation processing, which can contain the predetermined random calculation, using the result of the calculation 2 and the wedding anniversary received via the receiving processing unit 210 (hereinafter, called 'calculation 3') at the step SP207, consequently, the result of the calculation 3 is acquired at the step SP208. Furthermore, the server device 50 or the application server 60 acquires the wife's name input from the input unit of the terminal device 20 at the step SP209, the encryption processing unit 220 executes the calculation processing, which can contain the predetermined random calculation, using the result of the calculation 3 and the wife's name received via the receiving processing unit 210 (hereinafter, called 'calculation 4') at the step SP210, consequently, the result of the calculation 4 is acquired at the step SP211. Incidentally, the repeating of the above described calculation processing is not restricted. After that, the result of the calculation 4 is encrypted at the step SP212 (hereinafter, called 'encryption processing'), and the first key is acquired as the result of the encryption processing which is numerical sequence generated using the hash function at the step SP213, then, the processing ends (step SP214). Such predetermined standard generation character string is canceled when the standard generation ends. The successor is supplied with the first key as the individual key. Consequently, the generation accuracy of the first key and the certification accuracy of the successor improves by repeating the calculation processing plural times using plural of the predetermined standard item, and so the advanced security provision can be realized. The input information input to the terminal device for generating the first key can be supplied to the server device in a lump.

Figure 7:
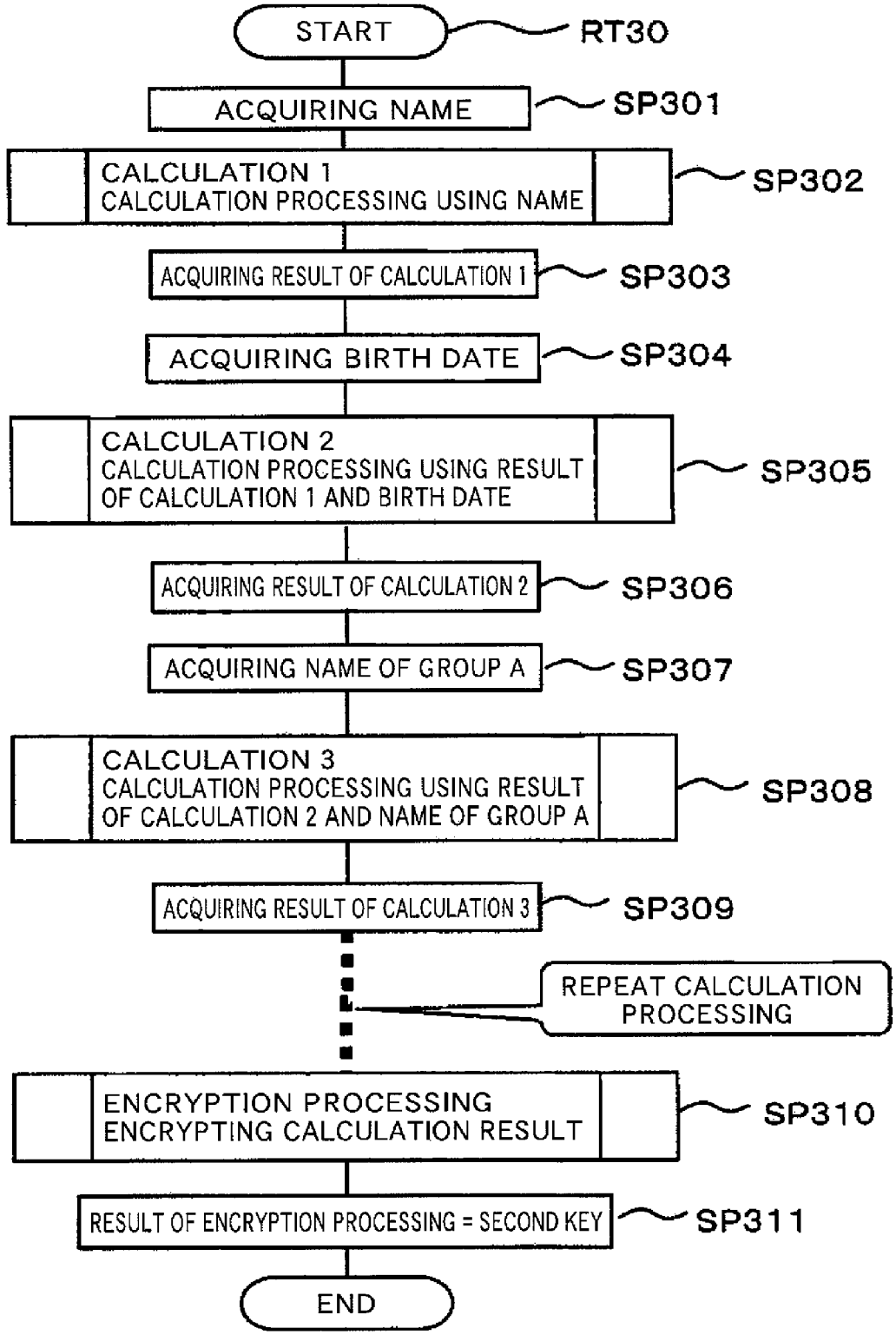
FIG. 7 is a flow chart according to an example of the present invention, showing an automatic generation of the second key when registering the predetermined information and a certification processing of the second key by a successor.

FIG. 7 is a flow chart showing an automatic generation of the second key at the time of registering the predetermined information, according to an embodiment of the present invention. The second key is automatically generated using the combination of the user identification information corresponding to the service contractor oneself and the information corresponding to the group of the user registration information that is registered. For example, the second key is automatically generated using the information input from the terminal device by the calculation processing shown in FIG. 7, using the combination of the ID information, for example, the name of identical person and the birth date of identical person, and the name of the group A. The encryption processing performed by repeating the calculation processing, which can contain the predetermined random calculation, in the second key generation shown in FIG. 7 is similar to the encryption processing for generating the first key shown in FIG. 6. In connection with FIG. 7, the steps RT30 and SP301 to RT306 are similar to the steps RT20 and SP200 to SP205 of FIG. 6. The steps SP 307 and SP308 of FIG. 7 differ from the steps SP206 and SP207 of FIG. 6 in that the processing of FIG. 7 use "the name of group A" instead of "wedding anniversary". After acquiring the result of the calculation 3 at step SP303, one or more similar calculation processing can be repeated. At the step SP310, the result of the calculation is encrypted similar to the step SP212 of FIG. 6. Then, the second key is acquired as the result of the encryption processing at the step SP311. The automatically generated second key can be used for the encryption and the decryption of the succeeded information. The second key is provided with the individual identifier and stored into the second key management device 80.

At the step SP30, the personality data storage unit 270 stores the generated personality data with correlated to the ID information, and the data storage unit 230 stores the encrypted user input information with correlated to the ID information.

At the step SP40, the successor input information and the ID information are sent from the terminal device 20 to the server device 50 when the successor operates the input unit 110 of the terminal device 20 after confirming the death of the user. Then, the server device 50 receives the successor input information and the ID information using the receiving processing unit 210.

At the step SP50, the input information analyzing unit 290 generates the characteristic data indicating the characteristic of the successor input information by analyzing the received successor input information.

At the step SP60, the personality data storage unit 270 searches the personality data of the user, who is the ancestor, based on the ID information from among the personality data stored in the personality data storage unit 270.

Moreover, the data storage unit 230 searches the user input information of the user or the ancestor based on the ID information from among the user input information stored in the data storage unit 230, then, searches the user input information corresponding to the characteristic data from among the searched user input information. Next, the decryption processing information 240 commands the encryption key definition file management unit 190 to acquire the second key used for decrypting the searched user input information, and decrypts the searched user input information using the transferred second key.

As described above, the first key is generated by executing the sequence of processing shown in FIG. 6 in which the name, the birth date, the wedding anniversary and the wife's name of the service contractor are used as the ID information. Then, the successor having the generated first key (who is the wife of the service contractor in this case) inputs each ID information using the input unit of the terminal device 20, and the similar calculation processing is performed each time the ID information is input. If the result of the encryption processing at the step SP213 accords to the first key of the successor who is the wife, the successor is certificated. Furthermore, if the generation result of the first key accords to the identifier uniquely added to the second key, the successor can acquire the second key, can acquire one's desired information, can decrypt the desired information acquired using the second key and can use it.

In detail, corresponding first key is searched from among the first key file in the first key management device 70 using the generated first key. If the corresponding first key is not found, the processing ends as certification failure. In contrast, if the corresponding first key is found, the corresponding key group is transferred from the first key management device 70 to the application server 60. When the corresponding first key is found and the group of the corresponding first key is transferred to the application server 60, the application server 60 makes the terminal device 2 of the successor or other user to select one's desired succeeded information to be searched next time.

When the succeeded information desired to be searched is specified and sent from the terminal device 20 to the application server 60, the application server 60 searches the identifier uniquely added to the second key, which relates to the succeeded information desired to be searched, from among the group of the first key transferred from the first key management device 70.

By using the identifier which is uniquely added to the second key and searched from the group of the first key in the application server 60, the second key corresponding to the identifier uniquely added to the second key is searched from among the group of second key in the second key management device 80.

The second key management device 80 transfers the second key, which corresponds to the identifier uniquely added to the second key, to the application server 60.

The application server 60 searches the succeeded information desired to be searched from among the information stored in the database server 90 working as the data storage unit 230, and transfers the succeeded information desired to be searched to the application server 60.

The transferred succeeded information desired to be searched is decrypted using the second key transferred from the second key management device 80, and is transferred to the terminal device 20. The encrypted communication using the predetermined encrypted communication protocol such as a SSL (Secure Socket Layer) is used for the transferring information between the application server 60 and the terminal device 20.

When the succeeded information desired to be searched is transferred from the application server 60, the terminal device 20 performs only the displaying of the received information on the screen display device 160.

When registering the desired succeeded information, the application server 60 executes the above described processing, and the desired succeeded information is encrypted using the second key transferred from the second key management device 80, then, the encrypted information is transferred to the database server 90 and stored into it.

According to the above described processing, the all processing corresponding to the encryption key and the decryption key are executed in the application server 60, and only the displaying is executed by the terminal device 20. So, the displaying is not saved when the operation ends. Therefore, all information transferred to the terminal device 20 are deleted and not saved at the end of operation.

Incidentally, the first and the second keys are automatically correlated each other when the succession information of successor is specified. For example, as shown in FIG. 5, the second key, that is 'the key of group A', corresponds to the registered information of 'the group A', and so the first key of the 'wife' is generated by the processing shown in FIG. 6 when the wife is registered as the successor who succeeds the registered information of 'the group A'. Then, when the successor 'wife' is registered so as to succeed the registered information 'group A', the second key of the registered information 'the group A' generated by the processing shown in FIG. 7 can be acquired. The identifier uniquely added to the second key corresponding to the acquired information 'the group A' is acquired from among the records registered in the second key management device. The correlation for pairing the generated 'wife's first key' and the identifier uniquely added to 'the second key of the registered information group A' is recorded into the first key management device 70. At this time, both of the first key and the identifier uniquely added to the second key are recorded into the first key management device 70 under encrypted state. Similarly, the second key are generated by each registered information, and the combination of the first key and the identifier uniquely added to the second key is recorded into the first key management device 70 every time the information according to the succession to the successor is registered.

As to the processing shown in FIGS. 6 and 7, the way of omitting the predetermined calculation processing for the second and subsequent times may be employed when the service contractor and/or the successor continuously performs the processing.

At the step SP70, the communication information generation unit 280 generates the communication information for informing the successor using the characteristic data indicating the characteristic of the successor input information, the personality data of the user or the ancestor and the user input information related to the successor input information.

At the step SP80, the sending processing unit 250 gives the desired message to the successor by sending the communication information from the server device 50 to the terminal device 20 and making the terminal device 20 to output the communication information. Then, the information providing processing procedure RT10 jumps to the step SP90 and ends.

As described above, the present embodiment can generate and provide the communication information corresponding to the user or the ancestor when asked or called by the successor, and so the present embodiment can provide a response to remind the successor of the user or the ancestor when the successor asks or calls.

Incidentally, the present invention is not limited to the above described embodiment, and the various modifications which do not deviate the scope of the present invention can be employed. In addition, the above described embodiment is only an example of the embodiment for realizing the technical idea according to the present application, and so other embodiments can be employed as the technical idea of the present application.

Moreover, the value of the present invention does not reduce even when the device, the method or the system is equipped with the secondary product and commercialized.

The present invention can generate and provide the communication information corresponding to the user or the ancestor when asked or called by the successor. In the case where the user is an individual, for example, the user records the matters, of which the user wants to communicate to one's wife, husband, son, daughter, father and the mother, in each case. For example, one's thinking on a routine basis, commemorative photograph, commemorative movie, favorite music, voice and mail are recorded as individual sense of value and as means for communicating the predetermined user input information to other people, like a diary (or a blog). In this way, at the time of the user's illness, the user's job changing, the marriage of the user's child and so on, the user can communicate one's thoughts of which the user wants to communicate or leave to one's loved one such as the wife, the husband, the son, the daughter, the father and the mother. Moreover, in the case where the 'will' is recorded with the history for preparing the user's 'death' that is the biggest event in one's life, the information required for viewing the predetermined information left when the individual 'dies' is succeeded, and the access authority correlated to the predetermined information left when the individual dies are succeeded. As a result, the bereaved family members and the loved ones are provided with the authority for accessing the messages for emotional support, and are encouraged by the recorded massages. Moreover, in the case where the editing function of the artificial intelligence is additionally provided, 'the conversation with the decedent' (accurately, the imitation of the conversation with the decedent) as if the user is actually responding can be realized by the central processing device of the computer which extracts the necessary keyword from the above described recorded information, analyses the information recorded with correlated to a question (i.e. input information) and assembles sentences or answers when the user's wife, husband, son, daughter, father, mother and so on ask the user (already died) as if they are having conversation.

Therefore, the person (for example, the successor), who is authorized to access the stored user input information, can access the user input information in response to questions, at any time such as, when the authorized person feels lonely, when the authorized person wants advice or when the authorized person wants to share his/her joy. The corresponding message and the generated message are sent as if the user is alive (same as memories of life together) by an e-mail or a telephone (using recorded voice). Moreover, it is possible that the message can be sent at the 20th birthday of the child or the wedding anniversary of the couple according to the growth of the child. Incidentally, the successor or other person who succeeds the information can abandon the access authority, and the access authority can be succeeded to the legal successor when there is no right holder.

The present invention can allow the viewing of the information only to the people specified by the users using the first key, and can provide access authority by each group using the second key. Therefore, the present invention can ensure the security, and so can be realized by the legal person.

Hence, the present invention will bring substantial benefits and advantages not only for the information industry, but also for all kind of industries producing or using the secondary product using the information technology, for example, the electric industry, the space industry, the constructional industry and so on.

What is claimed is:

1. A server device connected to a first terminal device and a second terminal device, comprising:
   a first reception processing unit that receives a user input information, which at least contains one or more sentences written by a user, and a user identification information, which is used to identify the user, from the first terminal device, and stores them into a first received information storage area,
   a personality data generation unit that generates a personality data indicating a user's personality by analyzing the user input information stored in the first received information storage area, and stores the personality data into a personality data storage area,
   a personality data storage unit that stores the personality data stored in the personality data storage area correlating to the user identification information,
   a second reception processing unit that receives a request information, which contains a message to the user from a person, from the second terminal device together with the user identification information corresponding to the user, and stores them into a second received information storage area,
   a request information analyzing unit that generates a characteristic data indicating a substance of the message by analyzing the request information, and stores the generated characteristic data into a characteristic data storage area,
   a personality data searching unit that searches the personality data corresponding to the user using the user identification information from among all of the personality data stored in the personality data storage unit,
   a communication information generation unit that extracts one or more sentences from among the user input information corresponding to the user identification information of the user in order to provide a response corresponding to the substance of the message indicated by the characteristic data and that matches the personality indicated by the personality data, generates a communication information indicating an imitative response from the user to the person using the extracted user input information, and stores said imitative communication information into a communication information storage area, and
   a sending processing unit that makes the server device send the imitative communication information stored in the communication information storage area to the second terminal device.

2. The server device according to claim 1, wherein the personality data generation unit generates a vocabulary distribution data, which indicates an appearance frequency of each word, by classifying a character information included in the user input information by words, and generates the personality data by comparing the vocabulary distribution data and a previously generated standard vocabulary distribution data.

3. The server device according to claim 1, wherein the personality data generation unit generates the personality data by choosing plural elements as elements of specifying the personality, and rating the chosen element on the scales of a predetermined number.

4. The server device according to claim 1, wherein the personality data generation unit generates new personality data by analyzing the user input information with referencing the personality data stored in the personality data storage unit whenever the user input information is provided from the first terminal device, and stores them into the personality data storing unit accumulatively.

5. The server device according to claim 1, wherein the request information analyzing unit generates the characteristic data by extracting at least one word characterizing the whole of the request information from among the words included in a character information of the request information, and interchanges the characteristic data with the second terminal device.

6. The server device according to claim 1, further comprising;
   an encryption processing unit that encrypts the user input information using an encryption key acquired from the encryption definition file,
   a data storage unit that stores the user input information, which is encrypted by the encryption processing unit, with correlating to the user identification information,
   a data searching unit that searches the user input information correlated to the user identification information from among the user input information stored in the data storage unit, then, searches the user input information in connection with the predetermined characteristic data from among the searched user input information, and
   a decryption processing unit that decrypts the searched user input information using a decryption key in an encryption definition file acquired from an encryption definition file management unit;
   wherein the communication information generation unit generates the communication information using the characteristic data, the personality data and the searched user input information.

7. The server device according to claim 6 which comprises a information succession system having;

an application server that executes sending and receiving of information via a network, an encryption definition management server that manages an encryption definition file which contains a encryption key for encrypting the information, and a database server that stores the information encrypted using the encryption key;

wherein the encryption definition management server manages a first encryption definition file in which all of dummy files and real encryption definition files are encrypted, a second encryption definition file which is encrypted after renewing the information, and extracts the desired encryption definition file using a standard character string determined as necessary.

8. The server device according to claim 1 wherein the communication information is an imitative message generated by an artificial intelligence based on the personality data.

9. The server device according to claim 1 wherein the user input information used for the generation of the personality data includes a diary, an electronic mail or a blog.

10. An information providing method of a server device connected to a first terminal device and a second terminal device, comprising;

a first receiving processing step that receives a user input information, which at least contains one or more sentences written by a user, and a user identification information, which is used to identify the user, from the first terminal device, and stores them into a first received information storage area, a personality data generation step that generates a personality data indicating a user's personality by analyzing the user input information stored in the first received information storage area, and stores the personality data into a personality data storage area, a personality data storage step that stores the personality data stored in the personality data storage area correlating to the user identification information, a second reception processing step that receives a request information, which contains a message to the user from a person, from the second terminal device together with the user identification information corresponding to the user, and stores them into a second received information storage area, a request information analyzing step that generates a characteristic data indicating a substance of the message by analyzing the request information, and stores the generated characteristic data into a characteristic data storage area, a personality data searching step that searches the personality data corresponding to the user using the user identification information from among all of the personality data stored in the personality data storage unit, a communication information generation step that extracts one or more sentences from among the user input information corresponding to the user identification information of the user in order to provide a response corresponding to the substance of the message indicated by the characteristic data and that matches the personality indicated by the personality data, generates a communication information indicating an imitative response from the user to the person using the extracted user input information, and stores said imitative communication information into a communication information storage area, and a sending processing step that makes the server device send the imitative communication information stored in the communication information storage area to the second terminal device.

11. The information providing method of the server device according to claim 10, wherein the personality data generation step generates a vocabulary distribution data, which indicates a appearance frequency of each word, by classifying a character information included in the user input information by words, and generates the personality data by comparing the vocabulary distribution data and a previously generated standard vocabulary distribution data.

12. The information providing method of the server device according to claim 10, wherein the personality data generation step generates a personality data by choosing plural elements as elements of specifying the personality, and rating the chosen element on the scales of a predetermined number.

13. The information providing method of the server device according to claim 10, wherein the personality data generation step generates new personality data by analyzing the user input information with referencing a personal data stored in the personality data storage unit whenever the user input information is provided from the terminal device, and to store them into the personality data storing unit accumulatively.

14. The information providing method of the server device according to claim 10, wherein the request information analyzing step generates the characteristic data by extracting at least one word characterizing the whole of the request information from among words included in a character information of the request information, and interchanges the characteristic data with the second terminal device.

15. The information providing method of the server device according to claim 10, further comprising;

an encryption processing step that encrypts the user input information using an encryption key acquired from the encryption definition file, a data storage step that stores the user input information, which is encrypted by the encryption processing unit, with correlating to the user identification information, a data searching step that searches the user input information correlated to the user identification information from among the first user input information stored in the data storage unit, then, searches the user input information in connection with the predetermined characteristic data from among the searched user input information, and a decryption processing step that decrypts the searched user input information using the decryption key in an encryption definition file acquired from an encryption definition file management unit, wherein the communication information generation step generates the communication information using the characteristic data, the personality data and the searched user input information.

16. The information providing method of the server device according to claim 15, further comprising a step that manages a first encryption definition file in which all of dummy files and real encryption definition files are encrypted, a second encryption definition file which is encrypted after renewing the information, and extracts the desired encryption definition file using a standard character string determined as necessary.

17. The information providing method of the server device according to claim 10 wherein the communication information is an imitative message generated by an artificial intelligence based on the personality data.

18. The information providing method of the server device according to claim 17 wherein the user input information used for the generation of the personality data includes a diary, an electronic mail or a blog.

* * * * *